United States Patent
Munoz Delgado

(10) Patent No.: US 12,242,957 B2
(45) Date of Patent: Mar. 4, 2025

(54) DEVICE AND METHOD FOR THE GENERATION OF SYNTHETIC DATA IN GENERATIVE NETWORKS

(71) Applicant: Robert Bosch GmbH, Stuttgart (DE)

(72) Inventor: Andres Mauricio Munoz Delgado, Weil der Stadt (DE)

(73) Assignee: ROBERT BOSCH GMBH, Stuttgart (DE)

(*) Notice: Subject to any disclaimer, the term of this patent is extended or adjusted under 35 U.S.C. 154(b) by 1029 days.

(21) Appl. No.: 17/005,069

(22) Filed: Aug. 27, 2020

(65) Prior Publication Data

US 2021/0125061 A1    Apr. 29, 2021

(30) Foreign Application Priority Data

Oct. 28, 2019 (EP) ..................... 19205664

(51) Int. Cl.
  *G06N 3/08* (2023.01)
  *G06F 16/903* (2019.01)
(52) U.S. Cl.
  CPC ......... *G06N 3/08* (2013.01); *G06F 16/90335* (2019.01)
(58) Field of Classification Search
  CPC .............................. G06F 16/90335; G06N 3/08
  See application file for complete search history.

(56) References Cited

U.S. PATENT DOCUMENTS

| | | | |
|---|---|---|---|
| 11,583,134 B2* | 2/2023 | Choi | A47J 36/321 |
| 2006/0041403 A1* | 2/2006 | Jaber | G06F 17/18 |
| | | | 702/189 |
| 2016/0071264 A1* | 3/2016 | Agam | G06V 10/774 |
| | | | 382/128 |
| 2017/0286830 A1* | 10/2017 | El-Yaniv | G06N 3/045 |
| 2019/0318474 A1* | 10/2019 | Han | A61N 5/103 |
| 2020/0097554 A1* | 3/2020 | Rezagholizadeh | G06N 3/084 |
| 2020/0097767 A1* | 3/2020 | Perry | G06F 18/214 |

(Continued)

OTHER PUBLICATIONS

Lilian Weng ("From GAN to WGAN", Apr. 18, 2019) (Year: 2019).*

(Continued)

*Primary Examiner* — Jason B Dunham
*Assistant Examiner* — Huma Waseem
(74) *Attorney, Agent, or Firm* — NORTON ROSE FULBRIGHT US LLP; Gerard A. Messina

(57) ABSTRACT

A method to generate synthetic data instances. The method includes generating a synthetic data instance for an input variable value of an input variable supplied to the generative model, classifying the synthetic data instance to generate a classification result, determining a loss function value of a loss function, the loss function evaluating the classification result and determining the gradient of the loss function with respect to the input variable. Depending on the absolute value of the gradient, the method includes generating a plurality of modified input variable values, determining, for each modified input variable value, the gradient of the loss function, combining the gradients of the loss function to generate an estimated gradient, and modifying the input variable value in a direction determined by the estimated gradient to generate a further input variable value. The generative model generates a further synthetic data instance for the further input variable value.

12 Claims, 5 Drawing Sheets

(56) References Cited

U.S. PATENT DOCUMENTS

| | | | |
|---|---|---|---|
| 2020/0226205 A1* | 7/2020 | Nookala | G06F 17/18 |
| 2020/0285939 A1* | 9/2020 | Baker | G06N 7/01 |
| 2020/0327327 A1* | 10/2020 | Wu | G06V 30/19173 |
| 2020/0364864 A1* | 11/2020 | Shanbhag | G06T 11/008 |
| 2021/0327538 A1* | 10/2021 | Egilsson | C12Q 1/6883 |
| 2021/0338007 A1* | 11/2021 | Choi | G05B 19/042 |
| 2022/0027709 A1* | 1/2022 | Honkala | G06T 5/002 |
| 2022/0238131 A1* | 7/2022 | Park | G10L 21/0232 |
| 2022/0348903 A1* | 11/2022 | Ranganathan | G16B 40/30 |

OTHER PUBLICATIONS

Chen et al.( "Exploiting Vulnerabilities of Load Forecasting Through Adversarial Attacks", Jun. 25-28, 2019) (Year: 2019).*

Patel et al. ("Adversarial Learning-Based On-Line Anomaly Monitoring for Assured Autonomy", Nov. 12, 2018) (Year: 2018).*

Aji et al. ("Sparse Communication for Distributed Gradient Descent", Jul. 24, 2017) (Year: 2017).*

Tom White, "Sampling Generative Networks," Cornell University Library, 2016, pp. 1-11. https://arxiv.org/abs/1609.04468v3.

Lim, et al.:"DOPING: Generative Data Augmentation for Unsupervised Anomaly Detection with GAN", 2018 IEEE International Conference on Data Mining (ICDM), Nov. 2018, pp. 1122-1127, XP055555239.

Riviere, et al.: "Inspirational adversarial image generation Exploring the latent space of GANs", Jun. 17, 2019 XP055690526, pp. 1-11.

Sun, et al.: "Enhancing the Robustness of Deep Neural Networks by Boundary Conditional GAN", arxiv.org, Cornell University Library, NY, Feb. 28, 2019, XP081034787, pp. 1-7.

Thang-Tung, et al.: "Improving Generalization and Stability of Generative Adversarial Networks", arxiv.org, Cornell University Library, NY, Feb. 11, 2019, XP081027777, pp. 1-18.

* cited by examiner

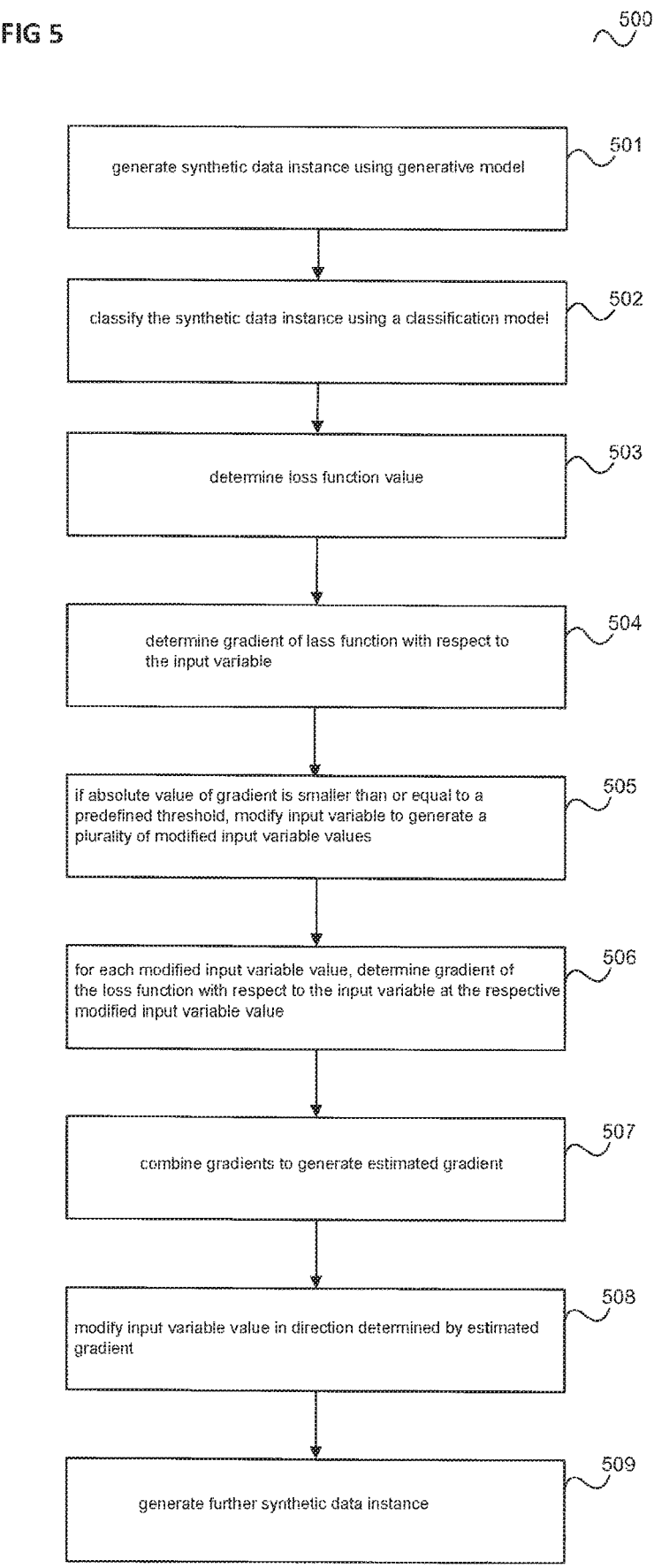

DEVICE AND METHOD FOR THE GENERATION OF SYNTHETIC DATA IN GENERATIVE NETWORKS

CROSS REFERENCE

The present application claims the benefit under 35 U.S.C. § 119 of European Patent Application No. EP 19205664.6 filed on Oct. 28, 2019, which is expressly incorporated herein by reference in its entirety.

FIELD

The present disclosure relates to a computer-implemented method for the generation of synthetic data instances using a generative model.

BACKGROUND INFORMATION

The research for deep generative models such as Generative Adversarial Nets (GANs) or Variational Autoencoders (VAE) has exploded over the last few years. These usually unsupervised models are showing very promising results, being nowadays already able to reproduce natural looking images at high resolution and at sufficient quality to even fool human observers.

The future potential uses for deep generative models are considerable, ranging from anomaly detection, high quality synthetic image generation to providing explainability tools for datasets and models. This can for example enable the creation of corner-case datasets to test automotive perception systems and sensors or the creation of meaningful inputs, i.e., inputs that have significance for a human being, that test the decision boundaries of a given model.

However, these potential benefits come at the cost of a harder and more complex training compared to the standard classification models. For example, during the training of a GAN, several problems may occur such as training instability, mode collapse, high variance gradients, vanishing generator gradients, etc.

Within the context of explainable AI (artificial intelligence), understanding how the generator of a generative model has structured its latent space is crucial to understanding what it has really learned.

Typically, the latent space of a generator is high-dimensional, so that an exhaustive search or analysis is intractable. In recent years, several methods for sampling and visualizing the latent spaces of generative models, such as the ones described in the paper "Sampling Generative Networks" by Tom White, published in CoRR abs/1609.04468, 2016 (available at https://arxiv.org/abs/1609.04468 and incorporated herein by reference) have been developed to search through the latent space, producing visualizations of the latent codes along the way which illustrate the relationships that have been learned by the generator.

This search for explanations, i.e., the search through the latent space of the generator, may be conditioned on the response (output) of a classification (discriminative) model, as a way of making sure that the path taken by the generator through the latent space produces realistic and meaningful instances (samples). This enables a better understanding of how well the generator models the transitions between semantic concepts.

In practice, the implementation of this conditioning can be achieved by an optimization procedure that includes the computation of gradients for the generator based on the response of the classifier (discriminator) to outputs of the generator. The optimization may for example be based on the optimization of an objective function, e.g. on the maximization or minimization of an objective function, and comprise one or more neural networks.

However, a problem may occur during the computations of the generator gradients where the gradients become very small or null. This is a similar problem to the well-known "vanishing generator gradients" problem that can occur during the training of a GAN.

SUMMARY

An example method and device of the present invention allow addressing the case that a gradient at a certain point of a search through the latent space of a generator, e.g., an optimizing search, becomes too small or null. Too small may be understood as being a gradient which is too small to allow a sufficient reduction or increase of the objective function (e.g., a loss function), i.e., a reduction or increase of the objective function that may lead to convergence in a reasonable time.

As a result, this may for example enable a more stable search and shorter search time through the latent space of a generator based on the conditioning of the search on the response of a classification (discriminative) model.

In particular, it may allow finding a working implementation of this conditioning.

Further examples are described in the following:

In accordance with an example embodiment of the present invention, a computer-implemented method is provided to generate synthetic data instances using a generative model generating a synthetic data instance for an input variable value of an input variable supplied to it may include a classification model classifying the synthetic data instance to generate a classification result, determining, for the classification result, a loss function value of a loss function, the loss function evaluating the classification result, determining the gradient of the loss function with respect to the input variable at the input variable value, further comprising, if the absolute value of the gradient is smaller than or equal to a predefined threshold, modifying the input variable value to generate a plurality of modified input variable values, determining, for each modified input variable value of the plurality of modified input variable values, the gradient of the loss function with respect to the input variable at the respective modified input variable value, combining the gradients of the loss function with respect to the input variable at the respective modified input variable values to generate an estimated gradient at the input variable value and modifying the input variable value in a direction determined by the estimated gradient to generate a further input variable value; and the generative model generating a further synthetic data instance for the further input variable value. The example computer-implemented method mentioned in this paragraph provides a first example in accordance with the present invention.

The computer-implemented method allows addressing an issue which may arise during an optimization process of a loss function using a generative model, such as e.g. the above-mentioned search through the latent space of the generator, where the gradients of the loss function become too small for the optimization process to continue and/or to converge in a reasonable time. In such a case, using the above described method generates a new (further) input variable value in order to compute a new gradient at this new input variable value.

For example, it can be achieved that the new (estimated) gradient has a larger absolute value than the (original) gradient, enabling the optimization process of the loss function to continue and/or to converge in a reasonable time.

Therefore, the described method may enable a more stable search and a shorter search time, e.g., through the latent space of a generator based on the conditioning of the search on the output of any compatible auxiliary model, e.g., on the response of a classification (discriminative) model.

The method may further include that combining the gradients of the loss function comprises summing or averaging the gradients of the loss function with respect to the input variable at the respective modified input variable values. The features mentioned in this paragraph in combination with the first example provide a second example in accordance with the present invention.

Summing or averaging of the gradients at the modified input variable values, e.g., by use of the arithmetic mean, is done to reduce the effects of possible outliers and to ensure that the resulting estimated gradient is close to the true gradient of the loss function.

The example method may further include that modifying the input variable value to generate a plurality of modified input variable values comprises adding noise to the input variable value. The features mentioned in this paragraph in combination with any one of the first example to second example provide a third example in accordance with the present invention.

Adding controlled noise to the input variable value, e.g. Gaussian noise, allows finding a good estimate of the true gradient of the loss function, under conditions where otherwise no gradient, or a gradient smaller than a predefined threshold, would be returned. The ideal parameters for the noise added to the input variable may for example be found experimentally.

The method may further include checking whether the estimated gradient is above the predefined threshold or a further predefined threshold, if the absolute value of the estimated gradient is smaller than or equal to the predefined threshold or the further predefined threshold, performing the following again one or more times to modify the estimated gradient: modifying the input variable value to generate a plurality of modified input variable values, determining, for each modified input variable value of the plurality of modified input variable values, the gradient of the loss function with respect to the input variable at the respective modified input variable value, and combining the gradients of the loss function with respect to the input variable at the respective modified input variable values to generate an estimated gradient at the input variable value. The features mentioned in this paragraph in combination with any one of the first example to third example provide a fourth example in accordance with the present invention.

In case the estimated gradient value is not above the predefined threshold or a further predefined threshold (i.e., a different threshold may be set for the estimated gradient value than for the gradient value) the modification of the gradient value may be repeated until a fitting estimated gradient has been found.

The method may further include searching for an optimum of the loss function, wherein the loss function is evaluated along a sequence of input variable values, determining for each input variable the gradient of the loss function with respect to the input variable at the input variable value, if the absolute value of the gradient is smaller than or equal to a predefined threshold, modifying the input variable value to generate a plurality of modified input variable values, determining, for each modified input variable value of the plurality of modified input variable values, the gradient of the loss function with respect to the input variable at the respective modified input variable value, combining the gradients of the loss function with respect to the input variable at the respective modified input variable values to generate an estimated gradient at the input variable value and modifying the input variable value in a direction determined by the estimated gradient to generate a further input variable value, and stopping the search for the optimum when the loss function for the last input variable value of the sequence of input variable values fulfils a predetermined convergence criterion. The features mentioned in this paragraph in combination with any one of the first example to fourth example provide a fifth example in accordance with the present invention.

As mentioned above, the method allows addressing the issue of vanishing gradients during an optimization process of a loss function using a generative model. During the optimization of the loss function each time the absolute value of the gradient of the loss function is too small, i.e., smaller than a predefined threshold, e.g., too small to allow reasonable numeric processing (e.g., well above the size of rounding errors), an estimated gradient value is used instead. This is done until the optimization of the loss function stops, i.e., when a predetermined convergence criterion has been reached.

The method may further include that the input variable supplied to the generative model is a latent space variable. The features mentioned in this paragraph in combination with any one of the first example to fifth example provide a sixth example in accordance with the present invention.

In particular, the input variable may be a latent variable sampled to follow a predefined probability distribution, e.g., a uniform or a Gaussian probability distribution, or it may be an intermediary latent space representation of an optimization process.

The method may further include that modifying the input variable value in a direction determined by the estimated gradient to generate a further input variable value comprises adding or subtracting the estimated gradient multiplied by a predefined learning rate from the input variable value. The features mentioned in this paragraph in combination with any one of the first example to sixth example provide a seventh example in accordance with the present invention.

Moving the input variable value in the direction of the estimated gradient multiplied by a predefined learning rate allows controlling the step size taken when generating the further input variable value. The step size has to be large enough to get far enough away from the gradient-saturating points, but has to be small enough to not "jump" over an extrema of the loss function and/or for the optimization process of the loss function to converge.

The method may further include that the classification model is a discriminator of a generative adversarial network. The features mentioned in this paragraph in combination with any one of the first example to seventh example provide an eighth example in accordance with the present invention.

The method may in particular be applied to the discriminator of a generative adversarial network, GAN. The discriminator of a GAN performs a binary classification task, and is thus often trained with a cross-entropy loss function expecting an activation function which models a Bernouilli probability distribution, such as for example the tank or the sigmoid activation function, and such activations functions are well known for their strong saturation at either end of the function. Thus, when the classification model used in the method is the discriminator of a GAN, the gradients of the loss function are likely to saturate, i.e., the gradients are likely to be null or smaller than the predefined threshold.

The method may further include that the generative model is one of a decoder part of an autoencoder or a variational autoencoder, a generative part of a generative adversarial network, a flow model and an autoregressive model. The features mentioned in this paragraph in combination with any one of the first example to eighth example provide a ninth example in accordance with the present invention.

The method may further include that a synthetic data instance is a synthetic image. The features mentioned in this paragraph in combination with any one of the first example to ninth example provide a tenth example in accordance with the present invention.

The application of the method for synthetic images may for example allow examining the object classification for autonomous driving or visual inspection systems. In particular, it may allow finding meaningful explanations for the object classification for autonomous driving and visual inspections systems, resulting in a better understanding of how sensible the classification reacts to changes in the input data. This information may then be used as a part of a verification and validation process of the performed object classification.

A computer-implemented method of training a neural network may include providing training sensor data samples forming a training dataset, training the neural network with the training dataset, generating one or more synthetic data instances according to any one of the first to the tenth example using a generative model trained on the training dataset (which may be an additional neural network), adding the one or more generated synthetic data instances to the training dataset to obtain an augmented training dataset, and training the neural network and/or another neural network and/or an image classifier, especially an image classifier comprising one of said neural networks, with the augmented training dataset. Such neural networks may be given as convolutional neural networks. The computer-implemented training method mentioned in this paragraph provides an eleventh example in accordance with the present invention.

The training method of the eleventh example enables to refine the existing model/dataset to obtain a better trained and more robust neural network, or to train a new model/neural network.

A device may include an actuator, and a controller configured to control the actuator using a classification result from a neural network trained according to the eleventh example. The device mentioned in this paragraph provides a twelfth example in accordance with the present invention.

Such a device enables a more robust classification of input sensor data, and thus a more reliable control of the actuator.

For example, in the context of autonomous driving, a robust object classification and thus a reliable vehicle control can be achieved.

A device may be configured to perform a computer-implemented method of any one of the first example to the eleventh example.

The device mentioned in this paragraph provides a thirteenth example in accordance with the present invention.

A computer program may include instructions arranged to cause a processor system to perform a computer-implemented method of any one of the first example to the eleventh example. The computer program mentioned in this paragraph provides a fourteenth example in accordance with the present invention.

A computer-readable medium may include transitory or non-transitory data representing instructions arranged to cause a processor system to perform a computer-implemented method of any one of the first example to the eleventh example. The computer-readable medium mentioned in this paragraph provides a fifteenth example in accordance with the present invention.

In the figures, like reference characters generally refer to the same parts throughout the different views. The figures are not necessarily to scale, emphasis instead generally being placed upon illustrating features of the present invention. In the following description, various aspects are described with reference to the figures.

BRIEF DESCRIPTION OF THE DRAWINGS

FIG. 5 shows a flow diagram illustrating an exemplary method for the estimation of the gradient.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

In the following, various examples will be described in more detail.

Figure 1:
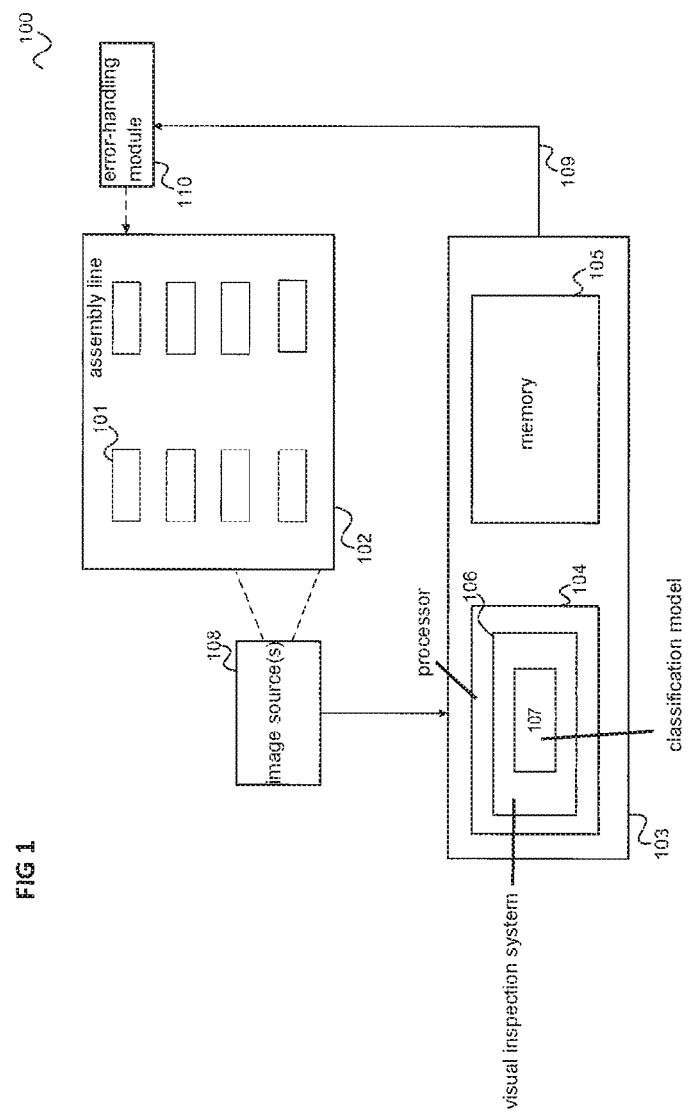
FIG. 1 shows an exemplary visual inspection system for the detection of defective parts.

FIG. 1 shows an inspection system 100 illustrating an example for the detection of defective parts.

In the example of FIG. 1, parts 101 are positioned on an assembly line 102.

A controller 103 includes data processing components, e.g. a processor (e.g., a CPU (central processing unit)) 104 and a memory 105 for storing control software according to which the controller 103 operates, and data on which the processor 104 operates.

In this example, the stored control software comprises instructions that, when executed by the processor 104, make the processor 104 implement a visual inspection system 106.

The visual inspection system 106 includes a classification model 107 which includes at least one neural network, and is capable of performing classification of input sensor data provided thereto. In particular, the classification model may be a binary classifier.

The data stored in memory 105 may for example include image data from one or more image sources (sensors) 108, e.g. cameras. An image can include a collection of data representing one or more objects or patterns. The one or more image sources 108 may for example output one or more greyscale or color pictures of each of the parts 101. The one or more image sources 108 may be responsive to visible light or non-visible light such as e.g. infrared or ultraviolet light, ultrasonic or radar waves, or other electromagnetic or sonic signals.

It should be noted that the classification of an image may be regarded to be equivalent to the classification of an object shown in the image. If an original image shows multiple objects or patterns, a segmentation may be performed (possibly by another neural network) such that each segment shows one object or pattern, and the segments are used as input to an image classifying neural network.

The controller 103 may determine that one of the parts 101 is defective based on the image data from the one or more image sources 108. For example, the classification model 107 may be a binary classifier and classify a part as "OK" if it meets all quality criteria, else, if a part fails at least one quality criterion, it may be classified as "Not OK".

The visual inspection system 106 may further provide an explanation for a "Not OK" classification of a part 101. The explanation can be constrained, by design, to a discrete set of possibilities, e.g., a physical defect in a specific location of the part or a change in the control conditions, such as lighting during the manufacturing process, etc.

Based on the explanation provided by the visual inspection system 106, the controller 103 may determine a part 101 to be defective. Controller 103 may then send a feedback signal 109 to an error-handling module 110. The feedback signal 109 contains the explanation, i.e., information representative of reasons (such as features of the part), why the part 101 has been determined to be defective.

Error-handling module 110 can then for example use the feedback signal 109 to adapt a manufacturing process accordingly. For example, when the explanation shows that the part has a particular physical defect in a specific location, error-handling module 110 may modify the operating parameters of the manufacturing process, such as, e.g., applied pressure, heat, weld time etc. to reduce the risk of such failures.

In case the explanation produced by the visual inspection system 106 is unexpected or critical according to predefined (and/or user-defined) criteria, the error-handling module 110 after receiving the feedback signal 109 may control the manufacturing process to operate in a safe mode.

Furthermore, the explanations may be used to determine how a "Not OK" image would have to be modified in order for the classification model to classify it as "OK", or how an "OK" image would have to be modified in order for the classification model to classify it as "Not OK". This information may then be used to generate new data samples using a generative model (not shown in FIG. 1) that may be incorporated into a future training set to refine the visual inspection system 106, or to train another model/system.

Further, a system as illustrated by FIG. 1 may be trained by learning the correspondence between an explanation and an operating parameter setting to learn optimal operating parameter settings for the manufacturing process.

A similar system as the one illustrated in FIG. 1 could be used in other technical fields, e.g., in an access control system, a computer-controlled machine such as a robot, a domestic appliance, a power tool or a personal assistant.

Figure 2:
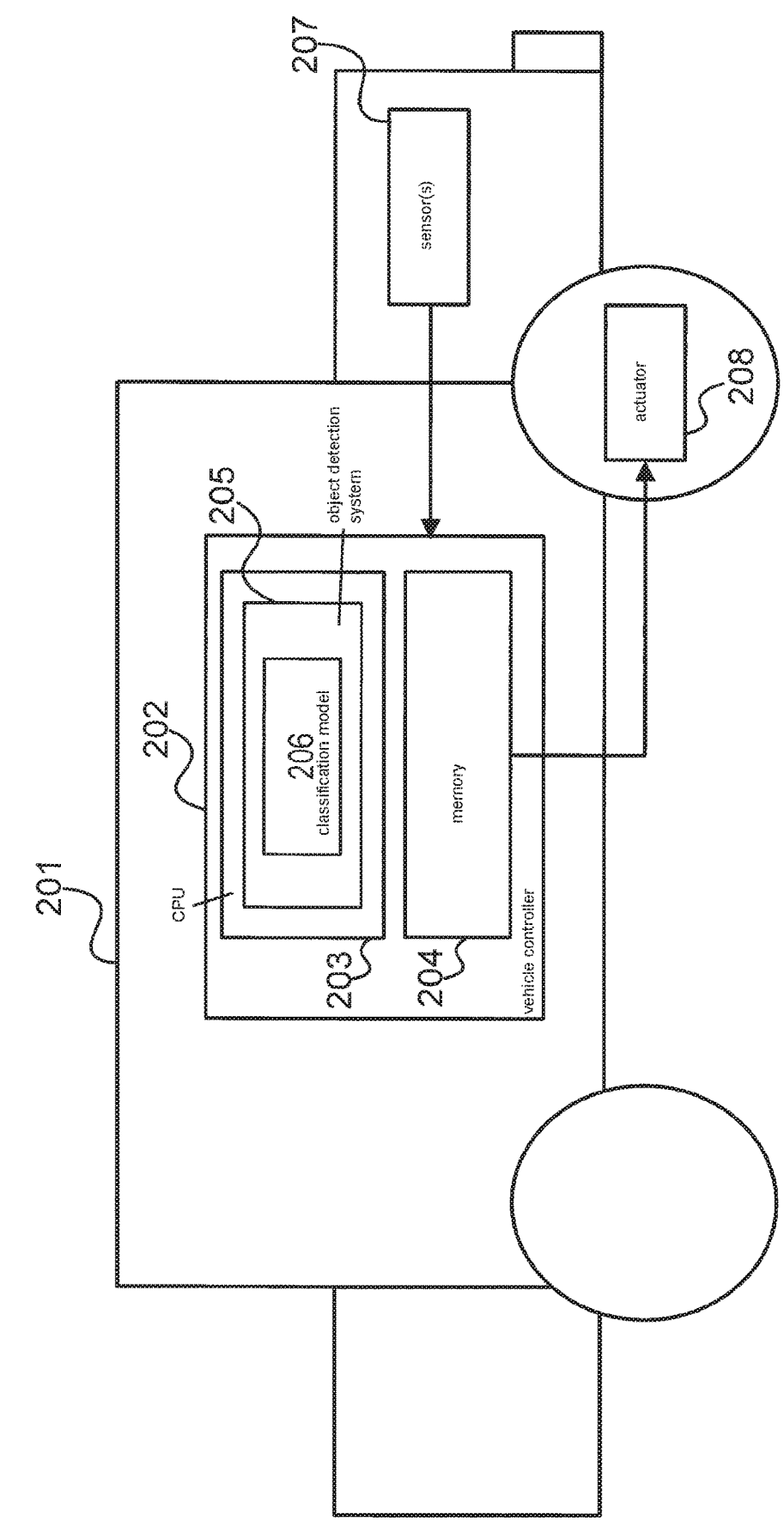
FIG. 2 shows an example of object classification in the context of autonomous driving.

FIG. 2 shows an example 200 for object detection in an autonomous driving scenario.

In the example of FIG. 2, a vehicle 201, for example a car, van or motorcycle is provided with a vehicle controller 202.

The vehicle controller 202 includes data processing components, e.g., a processor (e.g. a CPU (central processing unit)) 203 and a memory 204 for storing control software according to which the vehicle controller 202 operates and data on which the processor 203 operates.

In this example, the stored control software comprises instructions that, when executed by the processor 203, make the processor implement an object detection system 205 comprising a classification model 206, which includes at least one neural network, and is capable of performing classification of input sensor data provided thereto.

The data stored in memory 204 can include input sensor data from one or more sensors 207. For example, the one or more sensors 207 may be one or more cameras acquiring images.

An image can include a collection of data representing one or more objects or patterns. The one or more sensors, e.g. cameras, may for example output greyscale or color pictures of the vehicle's environment. The one or more sensors 207 may be responsive to visible light or non-visible light such as e.g. infrared or ultraviolet light, ultrasonic or radar waves, or other electromagnetic or sonic signals. For example, the one or more sensors 207 may output radar sensor data that measures the distance from objects in the front and/or the back of vehicle 201.

In this example, the input sensor data is assumed to be input image data.

It should be noted that the classification of an image may be regarded to be equivalent to the classification of an object shown in the image. If an original image shows multiple objects or patterns, a segmentation may be performed (possibly by another neural network) such that each segment shows one object or pattern, and the segments are used as input to an image classifying neural network.

Based on the input image data and by using the classification model 206, the control software may determine the presence of objects, e.g., fixed objects, such as traffic signs or road markings, and/or moving objects, such as pedestrians, animals and other vehicles.

The vehicle 201 may be controlled by the vehicle controller 202 in accordance with the determination of the presence of objects. For example, the vehicle controller 202 may control an actuator 208 to control the vehicle's speed, e.g., to actuate the brakes of the vehicle or to may prompt a human driver to take over control of the vehicle 201.

Before systems such as the inspection system 100 illustrated in FIG. 1 or the object detection system 205 illustrated in FIG. 2 are deployed in the field, they have to be tested and investigated for their reliability in classifying objects (parts). In particular, the robustness and reliability of the classification models/neural networks have to be ensured. To this end, it should be possible to check that the reasons behind the predictions output by the one or more classification models are meaningful, wherein meaningful reasons for the classification are reasons that are plausible and comprehensible for a human operator.

In general, the operation of these systems should be thoroughly investigated, in particular having regard to security and reliability. In other words, before deployment such systems have to be verified and validated.

To this end, i.e., to obtain meaningful explanations of the output of a classification model, the classification model may be investigated with the help of a generative model trained on the same dataset, i.e., on the same dataset used for the training/validation of the classification model.

The trained generative model is then used together with the classification model to investigate the reliability of the classification model.

Various generative models may be used, for example, the generative model may be a part of a generative adversarial network (GAN), may comprise a decoder part of an autoencoder, e.g., of a variational autoencoder (VAE), may be a flow model, or may be an autoregressive model.

In the following, an example for a generative model as part of a GAN will be described in more detail.

Figure 3:
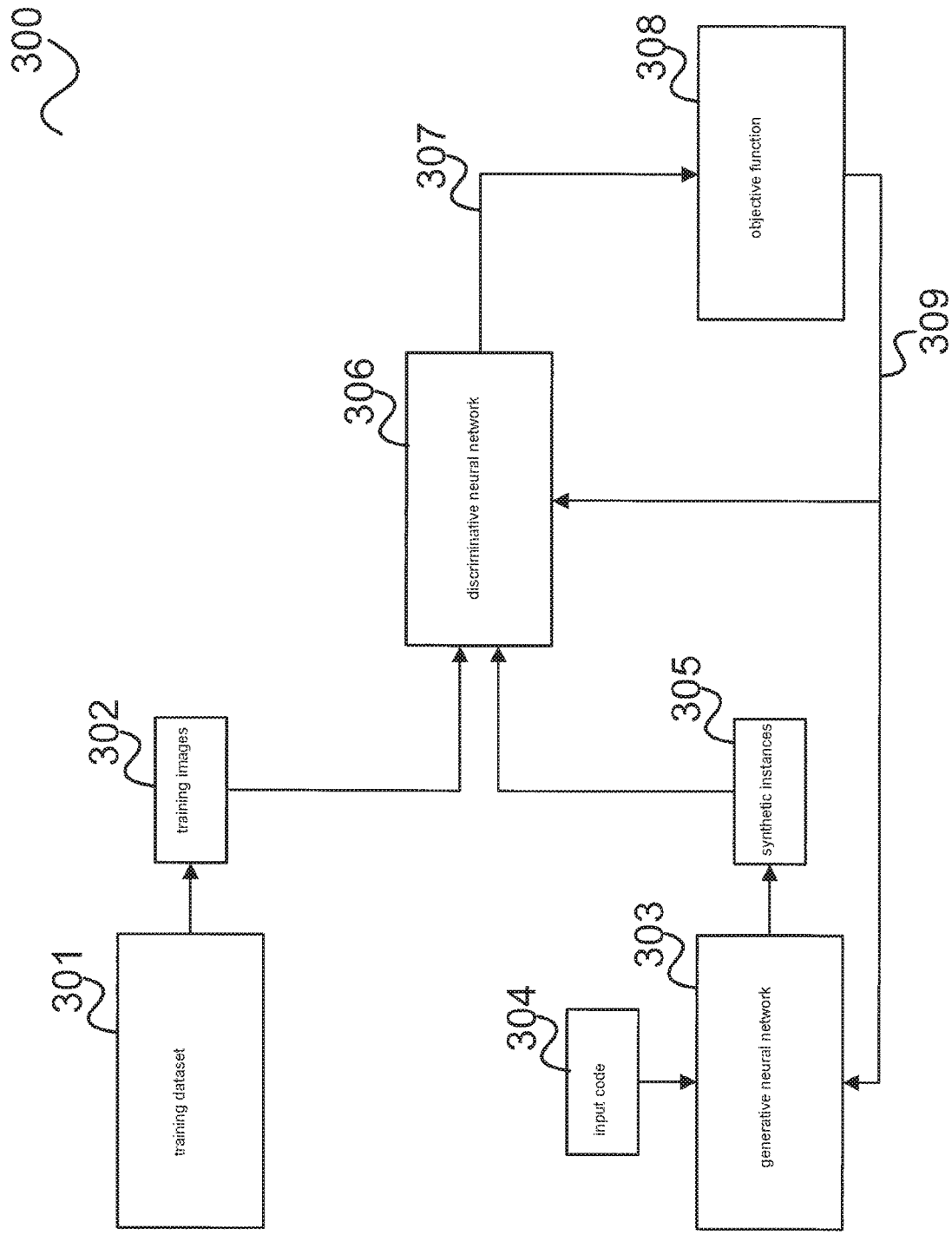
FIG. 3 shows an example of a generative adversarial network.

FIG. 3 shows an exemplary generative adversarial network, GAN, 300, in particular FIG. 3 shows an example of training a GAN.

In the example of FIG. 3, a training dataset 301 contains training images 302, wherein the training images all have the same size. It should be noted that in general the training dataset may contain other types of data, such as e.g. audio, radar, sonar, LiDAR, motion, etc. and that the training data (images) don't have to contain samples (images) all of the same size.

A generative neural network 303 receives an input code 304, which is for example an instance or value of a randomly or pseudo-randomly generated vector z following a pre-defined probability distribution, e.g., a uniform distribution or a normal distribution. Different input codes 304 may be provided to the generative neural network during training.

On the basis of an input code 304, the generator (short for "generative neural network") 303 generates a synthetic instance (image) 305 of the same size as the size of the training images 302. In other words, the generator 303 maps input codes to image space.

The space from where the input codes are sampled is known as the latent space of the generator. The generator maps this latent space, which on its own, i.e., taken in isolation, can be seen to have no meaning/structure, to the image space. This mapping done by the generator can be seen as providing a meaning/structure to the latent space. The input codes may thus also be referred to as latent space representations.

This structure given to the latent space by the generator can be explored, e.g., by interpolating and performing vector arithmetic between points (vectors) in the latent space, and observing the (meaningful) effects on the output synthetic images.

Hence, a latent space representation/input code may be regarded as a compressed representation of the final synthetic image which the generator outputs.

For example, based on input codes 304, the generator 303 may be trained to generate synthetic images 305 that are similar to the images contained in the training dataset 301

The input codes 304 typically have smaller dimensions than the images (instances) they generate, for example, having at most 1% or at most 0.1% of the number of parameters (features) of the generated images, and thus also of the images contained in the training dataset 301.

As an example, a synthetic image 305 may be an RGB image of size 256×256×3, and input code 304 may be a vector with 100 values, i.e., a latent space representation of the synthetic image 305 may consist of only 100 features.

By training the generator 303 to best reproduce the training dataset 301, a semantic meaning may be attributed to the features of the latent space representation. For example, if the generator is used to generate synthetic images of traffic situations, particular features may indicate the presence of a traffic light and the color it shows, types of vehicles, weather conditions, etc.

During the training, a discriminative neural network 306 is supplied with one or more training images, for example a batch of training images 302 from training dataset 301, and one or more synthetic images, for example a batch of synthetic images 305 from generator 303.

The discriminator (short for "discriminative neural network") 306 is then trained to distinguish between synthetic images generated by generator 303 and images contained in training dataset 301. In others words, the discriminator 306 is trained to maximize the probability of assigning the correct label to both images from the training dataset 301 and synthetic images 305 generated by generator 303.

The generator 303 is trained to maximize the probability of the discriminator 306 assigning the wrong label to synthetic images 305, i.e., is trained adversarially to try to fool the discriminator 306.

The discriminator 306 may be trained separately from generator 303, but typically both are trained on the same or similar training datasets, e.g., on training dataset 301. For example, the two may be trained repeatedly and alternatingly.

The discriminator 306 then outputs a classification score 307 for each image received from the training dataset and/or from the generator.

The classification score 307 may be a probability value, but may also more generally be a representation of a probability, e.g., a classification score where a higher score corresponds to a higher probability.

Typically, a classification score 307 indicating (corresponding to) a probability value of 1 indicates that the input image has been classified by the discriminator 306 as an image from training dataset 301, and a score indicating (corresponding to) a probability value of 0 indicates that the input image has been classified as a synthetic image 305 generated with generator 303.

The classification scores 307 are then used in an objective function 308, also often referred to as loss, value, or cost function.

In a GAN, a corresponding objective function should reflect the distance between the distribution of the data generated by the generator 303 and the distribution of the data contained in the training dataset 301.

An objective function 308 in the context of the training of a GAN is for example given by the following equation (1):

$$\min_G \max_D V(D, G) = \mathbb{E}_{x \sim p_{data}(x)}[\log D(x)] + \mathbb{E}_{z \sim p_z(z)}[\log(1 - D(G(z)))]$$

In equation (1), D is a discriminator, G is a generator, V(D,G) is a loss function, z are input codes following a distribution $p_z(z)$, D(x) represents the probability that an image x came from the underlying true (training) data distribution $p_{data}$ rather than from the generator distribution $p_g$ and D(G(z)) represents the probability that an image x=G(z) came from the generator distribution $p_g$ rather than then from the training data distribution $p_{data}$.

Thus, the training of a GAN can be thought of as a two-player minimax game where the performance of both neural networks improves over time, and where the goal is to find a Nash equilibrium. Ideally, at the end of the training $p_g = p_{data}$, i.e. the discriminator D is unable to differentiate between the training images and the synthetic images generated by generator G.

In 309, the weights/parameters of both the generator 303 and discriminator 306 are updated based on the optimization of the objective function 308. For example, V(D,G) in equation (1) is maximized, e.g. using gradient ascent and backpropagation, with respect to the weights/parameters of the discriminator 306 and minimized, e.g. using gradient descent and backpropagation, with respect to the weights/parameters of generator 303.

It should be noted that other objective functions may be used to train the GAN.

Once the GAN has been trained, the generator may for example be used to create synthetic instances/samples to augment a (training) dataset.

To explain and understand what a trained generator of a GAN has learned, it is important to understand how the generator has shaped its latent space. An exhaustive search through the latent space of the trained generator is however, due to its high dimensionality, typically intractable.

Therefore, conventional methods have been developed to examine how the generator has structured or shaped the latent space, for example by interpolating through the latent space.

Conditioning the search through the latent space on the output of a discriminator (e.g., discriminator 306) is a way of making sure that the path taken through the latent space produces meaningful and realistic samples/instances (e.g. synthetic images 305), i.e., samples/instances that show how well the model transitions between semantic concepts.

As mentioned earlier, the generator of a trained GAN may also be used in the field of explainable AI to increase the understanding of the outputs of deep neural networks, in particular of classification models.

For example, a generator of a GAN may be used to try to find meaningful explanations for the outputs of a classification model, wherein the generator of the GAN is trained on the same dataset as the classification model.

The trained generator of the GAN is then used together with the classification model to try to find meaningful explanations for the outputs of the classification model.

In particular, in order to find these meaningful explanations, a counterfactual to a synthetic data sample is generated using the trained generator of the GAN.

A counterfactual data sample is a data sample which, according to the classification model, has a different classification and/or a significantly different classification score (e.g. the classification score drops below a predetermined threshold) than a corresponding (synthetic) data sample.

It should be noted that in the following reference will be made to images for data samples, however, this does not exclude that other types of data samples may be used and/or generated.

The generated counterfactual should ideally have a small amount of meaningful (pixel) differences, i.e., where the (pixel) differences correlate to parts of the image that represent semantic objects or parts, in other words correlate to parts of the image that a human operator would also likely look at when classifying the objects. Thus, to a human operator, the meaningful differences should plausibly justify the change in classification and/or change in classification score.

Generating a counterfactual for a synthetic image may in particular be achieved by use of a perturbation mask m, wherein this mask indicates perturbations that disturb the classification of the synthetic image by the classification model. This perturbation mask m is applied to the latent space representations of the generated synthetic image. This will cause the generator to produce a new synthetic image which the classification model classifies differently. In other words, the mask m causes the generator to generate a counterfactual to a corresponding synthetic image.

It should be noted that the new generated synthetic image does not necessarily have to be a counterfactual and/or be classified differently; it may be classified the same but with less certainty, it may be close to the decision boundary of the classification model, etc.

Finding a suitable (small), ideally the smallest, perturbation mask m which significantly affects the classification of a synthetic image is useful to understand the properties of the classification model, in particular to find critical decision boundaries of the classification model, i.e. non-smooth, typically overfitted decision boundaries where the predictions are neither uniform nor predictable. In others words, it leads to a better understanding of how sensible the classification model is to changes in its input.

This investigation of the operation of the classification model may then be further developed and quantified into validation and verifications metrics, in particular into an evaluation of the reliability of the classification model.

In practice both optimization processes, i.e., conditioning the search through the latent space on the output of the discriminator and using the generator of a GAN together with a classification model to try to find meaningful explanations for the classification results require the computation of gradients for the generator G based on the response of the discriminator D, respectively of the classification model D' to the outputs of generator G. In other words, both cases require computing gradients with respect to an input code z for a loss (objective) function to be optimized (e.g. to be maximized or minimized), in particular for a loss function $D(G(z))$ respectively $D'(G(z))$ or for a loss function which contains the term $D(G(z))$ respectively $D'(G(z))$.

However, difficulties may occur when performing the required computations, such as e.g. gradient descent (ascent) and/or backpropagation, when the computed gradients with respect to z, are zero, or close to zero, e.g. are smaller than a predetermined threshold.

This type of problem typically occurs when a classification model and/or a discriminator D has a sigmoid or tan h output function. For example, the discriminator D used in a GAN, which performs a binary classification task by judging whether an input sample is from the training dataset or has been generated by the generator G, is often trained with a cross-entropy loss function expecting an output function which models a Bernouilli probability distribution, such as for example the tan h or the sigmoid output (activation) function.

The tan h activation function "squashes" the outputs between [−1, 1] and the sigmoid activation function between [0, 1]. These type of output functions therefore heavily saturate at one or both ends, i.e., the gradient of these functions converges to zero near at least one of the end points.

This type of problem may also occur during the training of the GAN, the so-called "vanishing generator gradient" problem. A possible solution during the training of the GAN is to use different batches of input data for the gradient computation, which increases training time, but may at least make it possible to continue the training for cases where the discriminator saturates.

However, this is not true in the case of an interpolation scheme where the search is conditioned on the output of a discriminator, e.g., the trained discriminator of a GAN, or when using an auxiliary (optimization) model with saturating output activations on top of the generator output, such as for example the above described method to find meaningful explanations for the outputs of the classification model by applying a perturbation mask to the latent space representations. In such cases, having a gradient equal to zero (or close to zero) may mean that the entire process (computation) cannot proceed. For example, to find meaningful explanations of why a particular image has been classified in a certain way by a classification model, it is not possible to use a different image, as opposed to it being possible during the training of a GAN.

It should be noted that systems such as the inspection system 100 for the detection of defective parts illustrated by FIG. 1, may have very strict acceptance criteria. This may result in extreme prediction scores, i.e., scores corresponding to a very high (close to one) or very low probability (close to zero).

For example, the system may often predict a "perfect" score corresponding to a probability of zero (or very close to zero) when a part has been classified as "Not Ok" and the system may often predict a "perfect" score corresponding to a probability of one (or very close to one) when a part has been classified as "OK", via a tank or sigmoid output function.

It should be noted that these "perfect" scores should not be understood as an indication of how accurate the model is, but results from the imposed very high acceptance criteria.

Perfect scores predicted by a system such as inspection system 100 would result in the above described problem of vanishing gradients for the gradients of D'(G(z)) with respect to z when searching for meaningful explanations for the classification scores of the parts inspected by the inspection system 100.

According to various embodiments, in such cases, a modified value for the gradient is used to make it possible to continue the computations and optimization of a loss function, i.e. to be able to continue an optimization process such as for example an interpolation process, a search for meaningful explanations and/or a search for the smallest perturbation mask.

It should be noted that using a modified gradient value may also be advantageous during the training of a GAN, enabling a more efficient and robust training of the GAN in cases where the discriminator saturates.

Ideally, this modified value for the gradient with respect to z should remain close to the actual gradient value, e.g. have a difference to the actual gradient value which is below a predetermined threshold. Furthermore, it should indicate the correct gradient direction in which the optimization of the loss function should continue.

Figure 4:
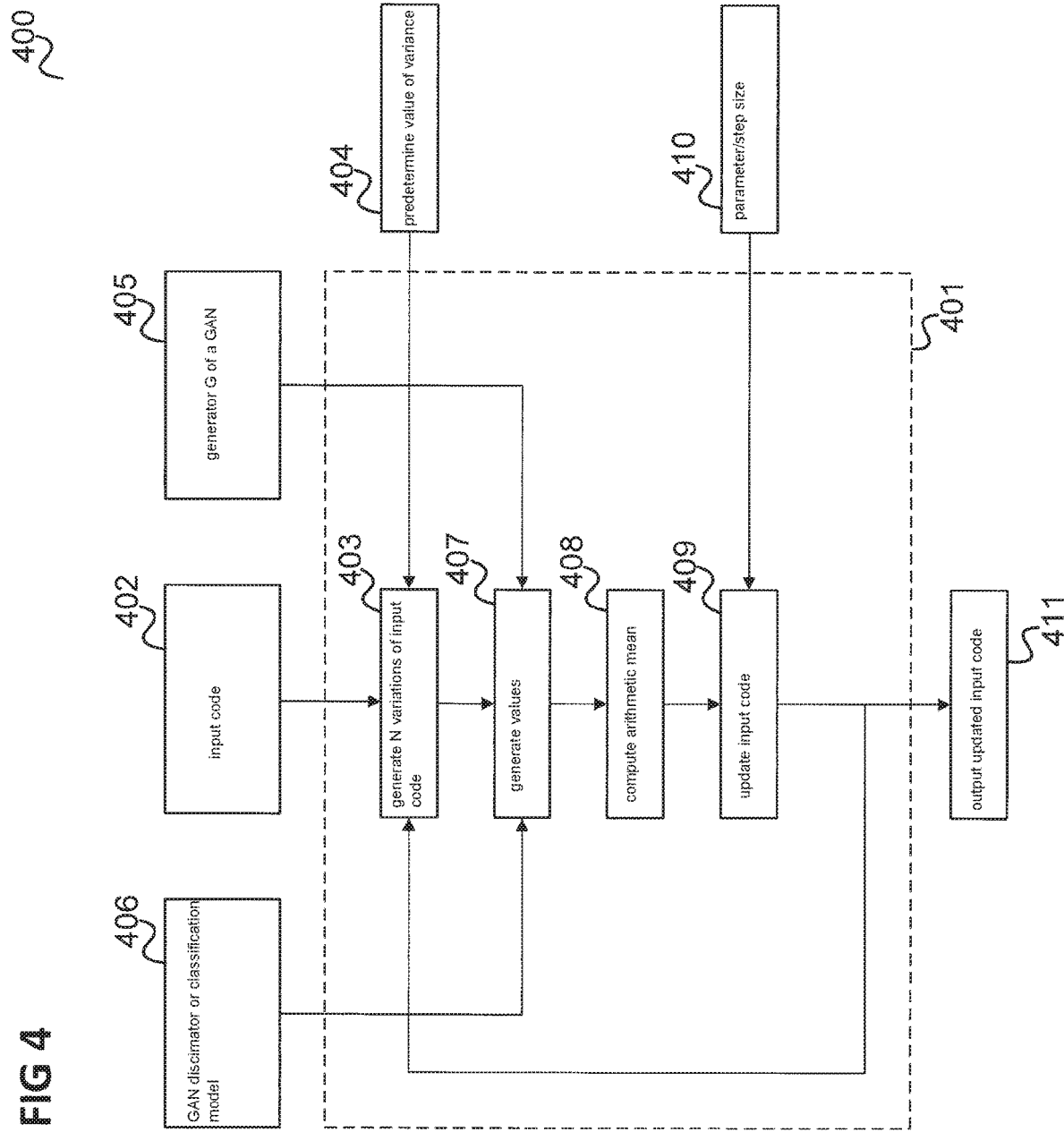
FIG. 4 shows an update of the input code of the generator of a generative adversarial network.

FIG. 4 illustrates an update of the input code of the generator of a generative adversarial network.

In particular, FIG. 4 shows how to change the underlying distribution of an input code z to modify the value of the gradient for a loss function with respect to z, e.g. for D(G(z)) or for D'(G(z)).

The broken line 401 represents the boundary between the processing to update the input code z and outside inputs/parameters.

The input code 402 is a k-dimensional input code z, also referred to as input vector, latent vector or latent space representation. The input code z may for example be sampled to follow a predefined probability distribution, e.g. a uniform or Gaussian probability distribution or it may be an intermediary latent space representation of an optimization process, e.g. such as the optimization processes described above.

In step 403, N variations of the input code z are generated by adding noise, in this example Gaussian noise following a $N(0,\sigma)$ distribution, to the vector z. This results in N values $z_k$ for $k=1, \ldots, N$.

It should be noted, that it is possible to use other distributions concentrated around the mean for the noise added to the vector z, such as e.g. the hyperbolic secant distribution, the Laplace distribution or the Student's-t distribution.

In 404, the value for the variance a used in step 403 is predetermined, e.g., provided or set by the model user.

A good value for the variance a may be found experimentally. The variance σ should be set as small as possible so that not all values $d_k$ computed in next step 407 are zero. The smaller the variance for the added Gaussian noise, the closer the gradient of $D(G(z_k))$ (or $D'(G(z_k))$) with respect to $z_k$ will be to the gradient of D(G(z)) (or D'(G(z))) with respect to z. However, the variance has to be large enough for the gradients/weights updates to not be too small. Thus, the variance should be large enough for an optimization process, e.g., the optimization of a loss function, to be able to proceed. For example, it should be large enough to continue an interpolation process, the search for meaningful explanations and/or the search for the smallest perturbation mask.

Reference 405 represents the generator G of a GAN. In this example, the generator G generates synthetic images of size P×Q×c by mapping the k-dimensional input code z to the image space.

$$G: \mathbb{R}^k \mapsto \mathbb{R}^{P \times Q \times c}$$

Reference 406 represents the GAN discriminator D or alternatively a classification model D'. In this example, the GAN discriminator D maps (generated) images of size P×Q×c to a single output:

$$D: \mathbb{R}^{P \times Q \times c} \mapsto \mathbb{R}$$

A classification model D' generally maps images of sizes P×Q×c to j different outputs (classes):

$$D': \mathbb{R}^{P \times Q \times c} \mapsto \mathbb{R}^j$$

During the training of the GAN, the weights/parameters for the generator G may be updated along the gradient direction that minimizes a loss corresponding to D(G(z)). This model is referred to as the critic C:

$$C: \mathbb{R}^k \mapsto \mathbb{R}$$

Alternatively, the classification model D' outputs a classification score based on a generated input and is "stacked" on top of the generator G.

The resulting model C' has a mapping similar to that of model C:

$$C': \mathbb{R}^k \mapsto \mathbb{R}^j$$

Computing the gradient of the output of either model C or C', i.e., computing D(G(z)) or D'(G(z)) with respect to input code z may result, as explained above, in zero (or close to zero) gradients.

Therefore, in case the gradient of C with respect to z is zero or close to zero, e.g. smaller than a predetermined threshold, in step 407 the gradients of the variations of input code z, i.e. the gradients $$\frac{d(D(G(z_k)))}{dz_k}$$

for each $z_k$, $k=1, \ldots, N$, are computed, resulting in N gradient values $d_k$, $k=1, \ldots, N$.

When a classifier D' is used instead of a discriminator D, the same computations are made for the case that the gradient of C' with respect to z is zero or close to zero, e.g. smaller than a predetermined threshold.

It should be noted that the variance a should to be chosen in such a way that at least one of the computed gradient values $d_k$ is different than zero.

In step 408, the arithmetic mean of the N computed gradient values $d_k$ of step 407 is computed, i.e., a value $$\hat{d} = \frac{1}{N}\sum_{k=1}^{N} d_k$$

is computed.

The steps 403, 407 and 408 may be repeated (performed again) until a fitting gradient estimate $\hat{d}$ is found, for example until the gradient estimate $\hat{d}$ larger than the predefined threshold.

It should be noted that the noise added to the input code z may be varied when the steps are repeated. In particular, the variance σ may be selected differently when the steps are repeated.

In step 409, the input code z is updated to a new input code z' in the following way:

$$z' = z - \alpha\hat{d}$$

wherein α is a parameter 410 which can be seen as a step size. In particular, α may be a predefined learning rate.

In 411, the updated input code z' is output. It may then for example be used by generator G to generate synthetic data instances (images).

It should be noted that the updated input code z' is not necessarily the final input code z* of the optimization process, i.e., the input code which minimizes the loss function from the optimization process. This final input code z* is typically the one that is used to generate a minimal and suitable perturbation mask.

Thus, for cases where the gradient of D(G(z)) (or D'(G(z))) with respect to z is zero or close to zero, adding some controlled noise to the input code z allows using the gradient of D(G(z')) (or D'(G(z'))) instead of the true gradient of D(G(z)) (or D'(G(z))).

It should be noted that the method illustrated by FIG. 4 may also be used during the training of a GAN to provide an updated input code and an estimated gradient in cases where the discriminator saturates, enabling a more efficient and robust training of the GAN.

A further advantage of updating the input code according to the method steps above, is that the method is adaptive, i.e. near the gradient-saturating points on the tan h and sigmoid curves (which are usual output functions for the discriminator D), the estimated gradient will favor the gradient of points away from the saturation point. Furthermore, where the tan h and sigmoid curves achieve their maximal gradient value, the estimate is unbiased.

In summary, according to various embodiments, a computer-implemented method 500 for generating synthetic data instances using a generative model is provided as illustrated in FIG. 5.

In step 501, using the generative model, a synthetic data instance for an input variable value of an input variable supplied to the generative model is generated.

In step 502, using a classification model to classify the synthetic data instance a classification result is generated.

In step 503, a loss function value of a loss function for the classification result is determined, the loss function evaluating the classification result.

In step 504, the gradient of the loss function with respect to the input variable at the input variable value is determined.

In step 505, if the absolute value of the gradient is smaller than or equal to a predefined threshold, the input variable value is modified to generate a plurality of modified input variable values.

In step 506, for each modified input variable value of the plurality of modified input variable values, the gradient of the loss function with respect to the input variable at the respective modified input variable value is determined.

In step 507, the gradients of the loss function with respect to the input variable at the respective modified input variable values are combined to generate an estimated gradient at the input variable value.

In step 508, the input variable value is modified in a direction determined by the estimated gradient to generate a further input variable value.

In step 509, a further synthetic data instance for the further input variable value is generated by the generative model.

The method of FIG. 5 may be performed by one or more processors. The term "processor" can be understood as any type of entity that allows the processing of data or signals. For example, the data or signals may be treated according to at least one (i.e., one or more than one) specific function performed by the processor. A processor may include an analogue circuit, a digital circuit, a composite signal circuit, a logic circuit, a microprocessor, a central processing unit (CPU), a graphics processing unit (GPU), a digital signal processor (DSP), a programmable gate array (FPGA) integrated circuit or any combination thereof or be formed from it. Any other way of implementing the respective functions, which will be described in more detail below, may also be understood as processor or logic circuitry. It will be understood that one or more of the method steps described in detail herein may be executed (e.g., implemented) by a processor through one or more specific functions performed by the processor.

The approaches of FIG. 5 may be used for synthetic data corresponding to sensor signals from any sensor, i.e. operating on any kind of input sensor data such as video, radar, LiDAR, ultrasonic and motion.

It should in particular be noted that the synthetic data are not limited to images but can also correspond to any image-like data (e.g. data structured in the form of one or more two-dimensional or also higher-dimensional arrays) such as spectrograms of sounds, radar spectra, ultrasound images, etc. Moreover, raw 1D (e.g. audio) or 3D data (video, or RGBD (Red Green Blue Depth) data) can also be used as input.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A computer-implemented method to generate synthetic data instances using a generative model, the method comprising the following steps:
   generating, by the generative model, a synthetic data instance for an input variable value of an input variable supplied to the generative model;
   classifying, by a classification model, the synthetic data instance to generate a classification result;

determining, for the classification result, a loss function value of a loss function, the loss function evaluating the classification result;
determining a gradient of the loss function with respect to the input variable at the input variable value;
based on an absolute value of the gradient being smaller than or equal to a predefined threshold:
  modifying the input variable value to generate a plurality of modified input variable values,
  determining, for each modified input variable value of the plurality of modified input variable values, a gradient of the loss function with respect to the input variable at the respective modified input variable value,
  combining the gradients of the loss function with respect to the input variable at the respective modified input variable values to generate an estimated gradient at the input variable value, and
  modifying the input variable value in a direction determined by the estimated gradient to generate a further input variable value; and
generating, by the generative model, a further synthetic data instance for the further input variable value.

2. The method of claim 1, wherein each synthetic data instance is a synthetic image.

3. The method of claim 1, wherein the combining of the gradients of the loss function includes summing or averaging the gradients of the loss function with respect to the input variable at the respective modified input variable values.

4. The method of claim 1, wherein the modifying of the input variable value to generate a plurality of modified input variable values includes adding noise to the input variable value.

5. The method of claim 1, further comprising the following steps:
checking whether the estimated gradient is above the predefined threshold or a further predefined threshold;
based on the absolute value of the estimated gradient being smaller than or equal to the predefined threshold or the further predefined threshold, performing the following again one or more times to modify the estimated gradient:
  modifying the input variable value to generate an additional plurality of modified input variable values,
  determining, for each modified input variable value of the additional plurality of modified input variable values, a gradient of the loss function with respect to the input variable at the respective modified input variable value, and
  combining the gradients of the loss function with respect to the input variable at the respective modified input variable values to generate an estimated gradient at the input variable value.

6. The method of claim 1, further comprising the following steps:
searching for an optimum of the loss function, wherein the loss function is evaluated along a sequence of input variable values;
determining, for each input variable of the sequence of input variable values, a gradient of a loss function with respect to the input variable of the sequence at the input variable value;
based on the absolute value of the gradient being smaller than or equal to a predefined threshold:
  modifying the input variable value to generate a plurality of modified input variable values,
  determining, for each modified input variable value of the plurality of modified input variable values, the gradient of the loss function with respect to the input variable at the respective modified input variable value,
  combining the gradients of the loss function with respect to the input variable at the respective modified input variable values to generate an estimated gradient at the input variable value, and
  modifying the input variable value in a direction determined by the estimated gradient to generate a further input variable value;
stopping the searching for the optimum when the loss function for a last input variable value of the sequence of input variable values fulfils a predetermined convergence criterion.

7. The method of claim 1, wherein the input variable supplied to the generative model is a latent space variable.

8. The method of claim 1, wherein the classification model is a discriminator of a generative adversarial network.

9. A computer-implemented method of training a neural network, comprising the following steps:
providing training sensor data samples forming a training dataset;
training the neural network with the training dataset;
generating one or more synthetic data instances using a generative model trained on the training dataset, the generating including:
  generating, by the generative model, a synthetic data instance for an input variable value of an input variable supplied to the generative model;
  classifying, by a classification model, the synthetic data instance to generate a classification result;
  determining, for the classification result, a loss function value of a loss function, the loss function evaluating the classification result;
  determining a gradient of the loss function with respect to the input variable at the input variable value;
  based on an absolute value of the gradient being smaller than or equal to a predefined threshold:
    modifying the input variable value to generate a plurality of modified input variable values,
    determining, for each modified input variable value of the plurality of modified input variable values, a gradient of the loss function with respect to the input variable at the respective modified input variable value,
    combining the gradients of the loss function with respect to the input variable at the respective modified input variable values to generate an estimated gradient at the input variable value, and
    modifying the input variable value in a direction determined by the estimated gradient to generate a further input variable value; and
  generating, by the generative model, a further synthetic data instance for the further input variable value;
adding the one or more generated synthetic data instances to the training dataset to obtain an augmented training dataset; and
training the neural network and/or another neural network and/or an image classifier with the augmented training dataset.

10. A device comprising:
an actuator; and
a controller configured to control the actuator using a classification result from a neural network trained by:

providing training sensor data samples forming a training dataset;
training the neural network with the training dataset;
generating one or more synthetic data instances using a generative model trained on the training dataset, the generating including:
    generating, by the generative model, a synthetic data instance for an input variable value of an input variable supplied to the generative model;
    classifying, by a classification model, the synthetic data instance to generate a classification result;
    determining, for the classification result, a loss function value of a loss function, the loss function evaluating the classification result;
    determining a gradient of the loss function with respect to the input variable at the input variable value;
    based on an absolute value of the gradient being smaller than or equal to a predefined threshold:
        modifying the input variable value to generate a plurality of modified input variable values,
        determining, for each modified input variable value of the plurality of modified input variable values, a gradient of the loss function with respect to the input variable at the respective modified input variable value,
        combining the gradients of the loss function with respect to the input variable at the respective modified input variable values to generate an estimated gradient at the input variable value, and
        modifying the input variable value in a direction determined by the estimated gradient to generate a further input variable value; and
    generating, by the generative model, a further synthetic data instance for the further input variable value;
adding the one or more generated synthetic data instances to the training dataset to obtain an augmented training dataset; and
training the neural network with the augmented training dataset.

11. A device configured to generate synthetic data instances using a generative model, the device configured to:
generate, by the generative model, a synthetic data instance for an input variable value of an input variable supplied to the generative model;
classify, by a classification model, the synthetic data instance to generate a classification result;
determine, for the classification result, a loss function value of a loss function, the loss function evaluating the classification result;
determine a gradient of the loss function with respect to the input variable at the input variable value;
based on an absolute value of the gradient being smaller than or equal to a predefined threshold:
    modify the input variable value to generate a plurality of modified input variable values,
    determine, for each modified input variable value of the plurality of modified input variable values, a gradient of the loss function with respect to the input variable at the respective modified input variable value,
    combine the gradients of the loss function with respect to the input variable at the respective modified input variable values to generate an estimated gradient at the input variable value, and
    modify the input variable value in a direction determined by the estimated gradient to generate a further input variable value; and
generate, by the generative model, a further synthetic data instance for the further input variable value.

12. A non-transitory computer-readable medium on which are stored data representing instructions for generating synthetic data instances using a generative model, the instructions, when executed by a computer, causing the computer to perform the following steps:
generating, by the generative model, a synthetic data instance for an input variable value of an input variable supplied to the generative model;
classifying, by a classification model, the synthetic data instance to generate a classification result;
determining, for the classification result, a loss function value of a loss function, the loss function evaluating the classification result;
determining a gradient of the loss function with respect to the input variable at the input variable value;
based on an absolute value of the gradient being smaller than or equal to a predefined threshold:
    modifying the input variable value to generate a plurality of modified input variable values,
    determining, for each modified input variable value of the plurality of modified input variable values, a gradient of the loss function with respect to the input variable at the respective modified input variable value,
    combining the gradients of the loss function with respect to the input variable at the respective modified input variable values to generate an estimated gradient at the input variable value, and
    modifying the input variable value in a direction determined by the estimated gradient to generate a further input variable value; and
generating, by the generative model, a further synthetic data instance for the further input variable value.

* * * * *